United States Patent
Zheng et al.

(10) Patent No.: US 8,798,695 B1
(45) Date of Patent: Aug. 5, 2014

(54) PROXIMITY SENSOR USING ANTENNAS OF A USER DEVICE

(71) Applicants: Ming Zheng, Cupertino, CA (US); Mark Corbridge, Los Gatos, CA (US)

(72) Inventors: Ming Zheng, Cupertino, CA (US); Mark Corbridge, Los Gatos, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/621,646

(22) Filed: Sep. 17, 2012

(51) Int. Cl.
*H04M 1/00* (2006.01)

(52) U.S. Cl.
USPC ........................................................ 455/575.7

(58) Field of Classification Search
USPC .............. 455/550.1, 575.7, 575.5, 41.1–41.3
See application file for complete search history.

(56) References Cited

U.S. PATENT DOCUMENTS

| | | | | |
|---|---|---|---|---|
| 7,811,234 | B2 * | 10/2010 | McGrath | 600/508 |
| 2008/0045832 | A1 * | 2/2008 | McGrath | 600/427 |
| 2011/0021139 | A1 * | 1/2011 | Montgomery et al. | 455/41.1 |
| 2012/0214422 | A1 * | 8/2012 | Shi et al. | 455/67.11 |

* cited by examiner

*Primary Examiner* — Christian Hannon
(74) *Attorney, Agent, or Firm* — Lowenstein Sandler LLP

(57) ABSTRACT

Methods and systems of detecting objects in proximity to user devices and distinguishing between object types are described. One method includes measuring a magnitude of mutual coupling between two antennas of the user device using a transmitted signal by a first antenna and a received signal by a second antenna. The method distinguishes between the user device being proximate to free space, a first object type or a second object type using the magnitude of mutual coupling or magnitude of received signal strength. The first object type includes non-water-based objects that do not absorb electromagnetic radiation and the second object type includes objects that absorb electromagnetic radiation.

31 Claims, 8 Drawing Sheets

PROXIMITY SENSOR USING ANTENNAS OF A USER DEVICE

BACKGROUND

A large and growing population of users enjoys entertainment through the consumption of digital media items, such as music, movies, images, electronic books, and so on. Users employ various electronic devices to consume such media items. Among these electronic devices are electronic book readers, cellular telephones, personal digital assistants (PDAs), portable media players, tablet computers, netbooks and the like. These electronic devices wirelessly communicate with a communications infrastructure to enable the consumption of the digital media items. Typically, the communications infrastructure dictates transmit power levels for the electronic devices to use when transmitting data to the communications infrastructure. The electronic devices do not include transmit power managers for making their own determinations regarding what transmit power levels to use.

Electronic devices lack the ability to control their transmit power levels, such electronic devices cannot adjust their transmit power levels to reduce user exposure to radiation. There are FCC regulations that identify the specific absorption rate (SAR) permitted to electronic devices. SAR is a measure of the rate at which energy is absorbed by the body when exposed to a radio frequency (RF) electromagnetic field. In addition, the user's body can block the RF electromagnetic field in the direction of the user's body, thus reducing the gain in that direction.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Methods and systems for distinguishing between free space, a non-water-based object in proximity to a user device, or an object that absorbs electromagnetic radiation in proximity to the user device are described. The user device may be any content rendering device that includes a wireless modem for connecting the user device to a network. Examples of such user devices include electronic book readers, portable digital assistants, mobile phones, laptop computers, portable media players, tablet computers, cameras, video cameras, netbooks, notebooks, desktop computers, gaming consoles, DVD players, media centers, and the like. The user device may connect to a network to obtain content from a server computing system (e.g., an item providing system) or to perform other activities. The user device may connect to one or more different types of cellular networks.

Figure 1:
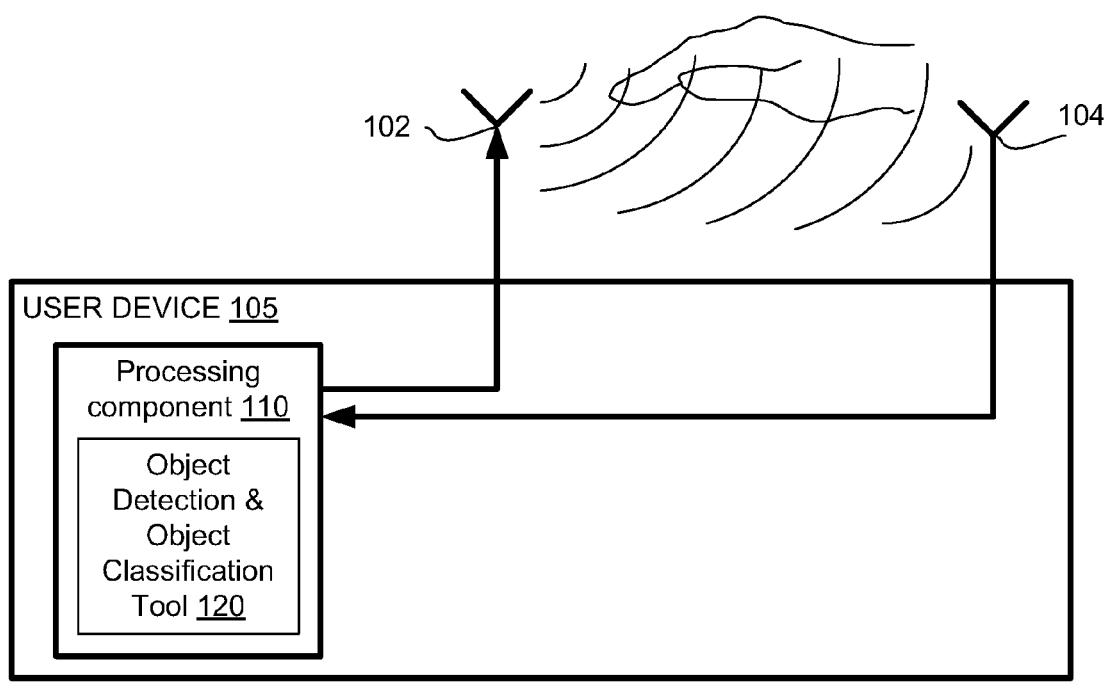
FIG. 1 illustrates one embodiment of a user device for objection detection and object classification using two antennas.

FIG. 1 illustrates one embodiment of a user device 105 for objection detection and object classification 120 using two antennas 102 and 104. The user device 105 uses the antennas 102 and 104 to communicate with other devices, such as an item providing system via a network (e.g. public network such as the Internet or private network such as a Local Area Network (LAN)). The item providing system may include one or more machines (e.g., one or more server computer systems, routers, gateways, etc.) that have processing and storage capabilities to provide the above functionality. The user device 105 may be variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user device 105 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

Communication between an item providing system and the user device 105 may be enabled via any communication infrastructure. One example of such an infrastructure includes a combination of a wide area network (WAN) and wireless infrastructure, which allows a user to use the user device 105 to purchase items and consume items without being tethered to the item providing system via hardwired links. The wireless infrastructure may be provided by one or multiple wireless communications systems. For example, one of the wireless communication systems may be a wireless fidelity (WiFi) hotspot connected with the network. Another of the wireless communication systems may be a wireless carrier system that can be implemented using various data processing equipment, communication towers, etc. Alternatively, or in addition, the wireless carrier system may rely on satellite technology to exchange information with the user device 105. In addition to wirelessly connecting to a wireless communication system, the user device 105 may also wirelessly connect with other user devices. For example, the user device 105 may form a wireless ad hoc (peer-to-peer) network with a second user device 134.

In one embodiment, the user device 105 includes a processing component 110 configured to perform various operations to handle both voice and non-voice communications. In one embodiment, the processing component 110 is a processor or other type of processing device. In another embodiment, the processing component 110 executes the object detection and classification tool 120 as described herein. In another embodiment, the processing component 110 is implemented in one or more modems of the user device 105.

In one embodiment, the user device 105 includes the first antenna 102 and the second antenna 104. The first antenna 102 is configured to communicate first data in a transmitting mode of the user device 105 and to transmit second data in a sensing mode of the user device 105. The transmitting mode is used to communicate with another device using one or more of the antennas, while the sensing mode is used to detect objects using two or more of the antennas. The second antenna 104 is configured to communicate third data in the transmitting mode and to receive the second data in the sensing mode of the user device. The user device also includes a processing component 110, such as a processing device or a processing component of a modem. The processing component 110 is coupled to the first antenna 102 and the second antenna 104. The processing component is configured to measure a mutual coupling magnitude between the first antenna 102 and the second antenna 104 and to detect a presence of an object in proximity to one or both of the first antenna 102 and the second antenna 104 using the mutual coupling magnitude. The mutual coupling may be a capacitive coupling between two electrodes, one transmitting electrode and one receiving electrode. In free space, the mutual coupling between the two electrodes has certain electrical characteristics. The introduction of an object between the two electrodes affects these electrical characteristics that can be measured as the mutual coupling. The processing component 110 is configured to distinguish whether the object is a first object type that absorbs electromagnetic radiation or a second object type that does not absorb electromagnetic radiation using the mutual coupling magnitude.

In a further embodiment, the processing component 110 is configured to compare the mutual coupling magnitude against a threshold value to distinguish whether the object is of the first object type or of the second object type. In one embodiment, the first object type includes human body parts, SAR phantoms used for testing electronic devices for FCC regulations, or the like, and the second object type includes non-conductive objects, non-water-based objects or the like. Non-water based objects refer to objects that have no or minimal amounts of water to contribute to the absorption of electromagnetic radiation. For example, wood, plastic, stones (such as granites and marbles), laminates and other similar composites have no water, and thus have a lower conductivity than other metal objects and human body parts. These non-water-based objects can be considered low conductivity in relation to human body parts, metal objects and other conductive objects. These non-water-based objects can also be considered insulators. Human body parts contain water and sodium that contribute to the absorption of electromagnetic energy and can be considered to be medium conductivity in relation to the non-water-based objects and metal objects that have high conductivity. In a further embodiment, the processing component 110 is configured to distinguish whether the object is of the first object type, the second object type or a metal surface.

In another embodiment, the object detection and classification tool 120 is configured to transmit a signal on the first antenna 102, measure a received signal on the second antenna 104, the received signal being based on the transmitted signal. The object detection and classification tool 120 computes a magnitude of mutual coupling between the first antenna 102 and the second antenna 104 using the transmitted signal and the received signal. The object detection and classification tool 120 detects a presence of an object in proximity to the user device 105 using the magnitude of mutual coupling. The object detection and classification tool 120 also distinguishes whether the object is a human body part that absorbs electromagnetic radiation or a second object type that does not absorb electromagnetic radiation using the magnitude of mutual coupling. In one embodiment, the object detection and classification tool 120 determines that the object is the human body part when the magnitude of mutual coupling exceeds a threshold value.

In another embodiment, the object detection and classification tool 120 determines whether the magnitude of mutual coupling exceeds a first threshold value that represents the presence of the object in proximity to the user device. The object detection and classification tool 120 may also determine whether the magnitude of mutual coupling exceeds a second threshold value. When the magnitude of mutual coupling exceeds the second threshold value, the detected object is the human body part, and, when the magnitude of mutual coping exceeds the first threshold value and does not exceed the second threshold value, the detected object is of the second object type that does not absorb electromagnetic radiation.

In another embodiment, the object detection and classification tool 120 measures a magnitude of mutual coupling between multiple antennas (e.g., two or more) of the user device 105 using a transmitted signal by one of these antennas and a received signal by another one of these antennas. The object detection and classification tool 120 uses the magnitude of mutual coupling to distinguish between the user device 105 being proximate to free space, a first object type or a second object type. The first object type includes non-water-based objects that do not absorb electromagnetic radiation and the second object type includes objects that absorb electromagnetic radiation. In a further embodiment, the object detection and classification tool 120 distinguishes the object types by detecting an object proximate to the user device using the magnitude of mutual coupling, and determining that the object is of the second object type when the magnitude of mutual coupling does not exceed a first threshold value. In a further embodiment, the object detection and classification tool 120 distinguishes between object types by determining that the object is of the first object type when the magnitude of mutual coupling exceeds the first threshold value and does not exceeds a second threshold value, the second threshold value being greater than the first threshold value. In a further embodiment, the object detection and classification tool 120 detects the free space when the magnitude of mutual coupling exceeds the second threshold value.

In one embodiment, when the object is of the second type, the object detection and classification tool 120 reduces a transmit power used by one or more of the plurality of antennas to transmit additional data to another device. In another embodiment, when the object is of the second type, the object detection and classification tool 120 switches a primary transmit antenna to a second antenna to transmit data.

In another embodiment, the object detection and classification tool 120 transmits a first signal on the first antenna 102 and measures a received signal on the second antenna 104, the received signal corresponding to the transmitted first signal. The object detection and classification tool 120 computes the magnitude of mutual coupling between the first antenna 102 and the second antenna 104 using the transmitted first signal and the received signal. In some embodiments, the signals are transmitted and received using a modem. The modem drives the transmit signals and measures the received signals. In other embodiments, separate circuitry may be used for generating the transmit signals and measuring the receive signals as illustrated in FIG. 2.

In a further embodiment, in addition to measuring the receive signal on the second antenna 104, a third antenna can be used to measure a second received signal, the second received signal corresponding to the transmitted first signal on the first signal. The object detection and classification tool 120 computes a second magnitude of mutual coupling between the first antenna 102 and the third antenna using the received signal and the second received signal. In a further embodiment, the object detection and classification tool 120 determines that the object is proximate to the first antenna 102 using the magnitude and the second magnitude, and, in response, switches transmission of information from the first antenna 102 to another one of the antennas, such as an antenna that is not proximate to the object. Similarly, the object detection and classification tool 120 can determine that the object is proximate to the second antenna 104 or the third antenna using the magnitude and the second magnitude, and, in response, can switch to transmit the information using another antenna that is not proximate to the object.

Figure 2:
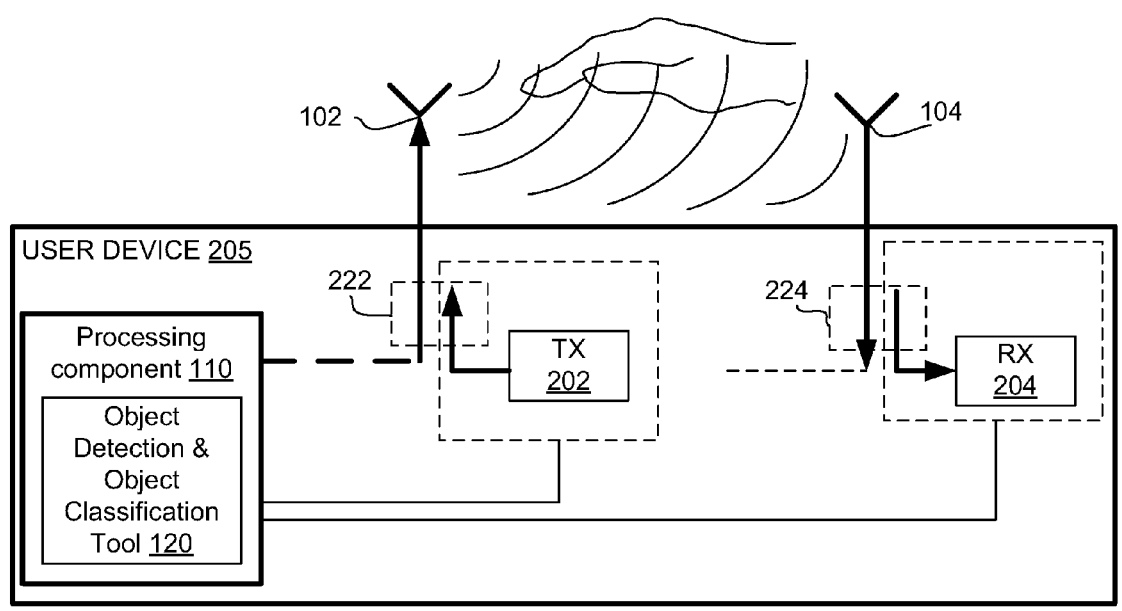
FIG. 2 illustrates another embodiment of a user device for objection detection and object classification using two antennas, a transmit signal generator and a receiver.

FIG. 2 illustrates another embodiment of a user device 205 for objection detection and object classification 120 using two antennas 102, 104, a transmit signal generator 202 and a receiver 204. The user device 205 is similar to the user device 105 as noted by similar reference numbers, except that the user device 205 also includes the transmit signal generator 202, receiver 204 and directional couplers 222, 224. The transmit signal generator (TX) 202 is configured to generate a transmit signal during a sensing mode. The transmit signal generator 202 is coupled to a transmission line that is coupled to the first antenna 102 via a first directional coupler 222. The receiver (RX) 204 is configured to measure a received signal corresponding to the transmit signal transmitted by the first antenna 102 during the sensing mode. The receiver 204 is coupled to a receive line that is coupled to the second antenna 104 via a second directional coupler 224. Directional couplers are passive devices used in RF technology to couple a defined amount of electromagnetic power in a transmission line to a port enabling the signal to be used in another circuit. These directional couplers couple power flowing in one direction, as power entering the output port is not coupled to the input port. In one embodiment, the directional couplers 222 and 224 can be formed by coupling a transmission line and a receive line close enough to the transmission line and the receive line coupled to the antennas such that energy passing through one is coupled to the other. In other embodiments, power dividers, power splitters, power combiners or other mechanisms can be used to couple the transmit signal generator 202 to the first antenna 102 and the receiver 224 to the second antenna 104 as would be appreciated by one of ordinary skill in the art having the benefit of this disclosure. It should also be noted that the transmit signal generator 202 can be used without the receiver 204, and the receiver 204 can be used without the transmit signal generator 202. In these embodiments, the processing component can use the antennas to transmit and receive signals during the sensing mode. It should also be noted that in some embodiments, different modes can be used to determine the mutual coupling between antennas. For example, a sensing mode can be used specifically to determine the mutual coupling, while a transmit mode can be used to transmit information to another device. Alternatively, the object detection and classification tool 120 can measure receive signals during transmission of information to another device, and determine mutual coupling using the measured signals transmitted during the transmit mode as would be appreciated by one of ordinary skill in the art having the benefit of this disclosure.

Figure 3:
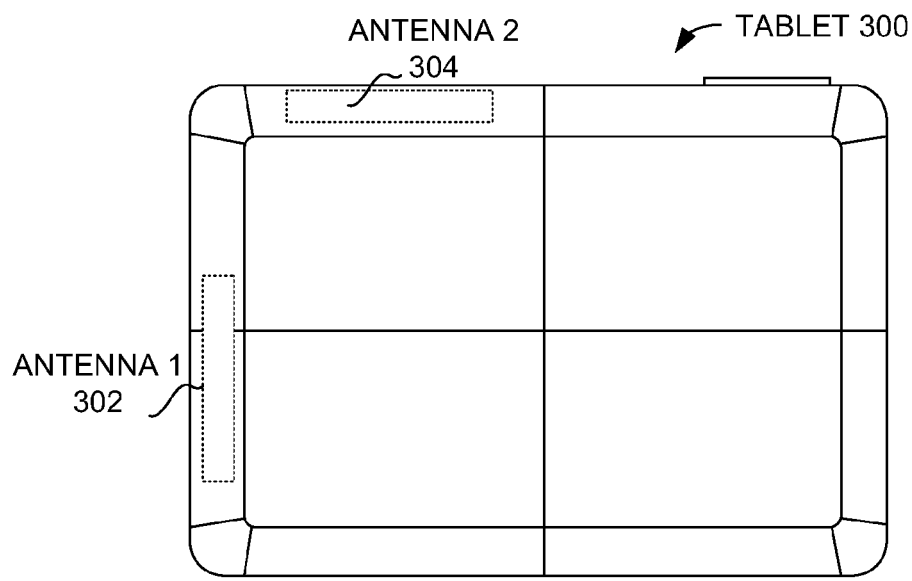
FIG. 3 illustrates one embodiment of a tablet computer having two antennas.

FIG. 3 illustrates one embodiment of a tablet computer 300 having two antennas 302 and 304. The tablet computer 300 includes a processing component, such as described above with respect to FIGS. 1-2 to distinguish between free space, and different types of objects in proximity to the tablet computer 300. In this embodiment, the first antenna 302 is disposed near an edge of one side of the tablet computer 300 and the second antenna 304 is disposed near the end of another side of the tablet computer 300. The antennas 302 and 302 are represented as blocks but could be any type of shape of antennas as would be appreciated by one of ordinary skill in the art having the benefit of this disclosure. In one embodiment, the first and second antennas 302 and 304 are the same type of antennas. For example, the first and second antennas 302 and 304 may be antennas used for communications in the LTE band. In another embodiment, the first and second antennas 302 and 304 are different types of antennas. In this embodiment, the first antenna 302 transmits a transmit signal and the second antenna 304 receives a receive signal that is based on the transmit signal. The processing component computes a magnitude of mutual coupling between the first antenna 302 and the second antenna 304 using the transmitted signal and the received signal. The processing component can detect a presence of an object in proximity to the tablet computer 300 using the magnitude of mutual coupling. The processing component can also distinguish whether the detected object is a human body part that absorbs electromagnetic radiation or a second object type that does not absorb electromagnetic radiation using the magnitude of mutual coupling. In other embodiments, the transmit signal is transmitted with the second antenna 304 and the first antenna 302 receives the corresponding receive signal. The processing component of the tablet computer 300 can transmit and receive signals using the first and second antennas 302 and 304 to perform other computations to distinguish between different types of objects in proximity to the tablet computer 300 as well as detect free space as described herein. In other embodiments, more than two antennas may be used to detect objects and distinguish between different types of objects, such as five antennas as depicted in and described with respect to FIG. 4.

Figure 4:
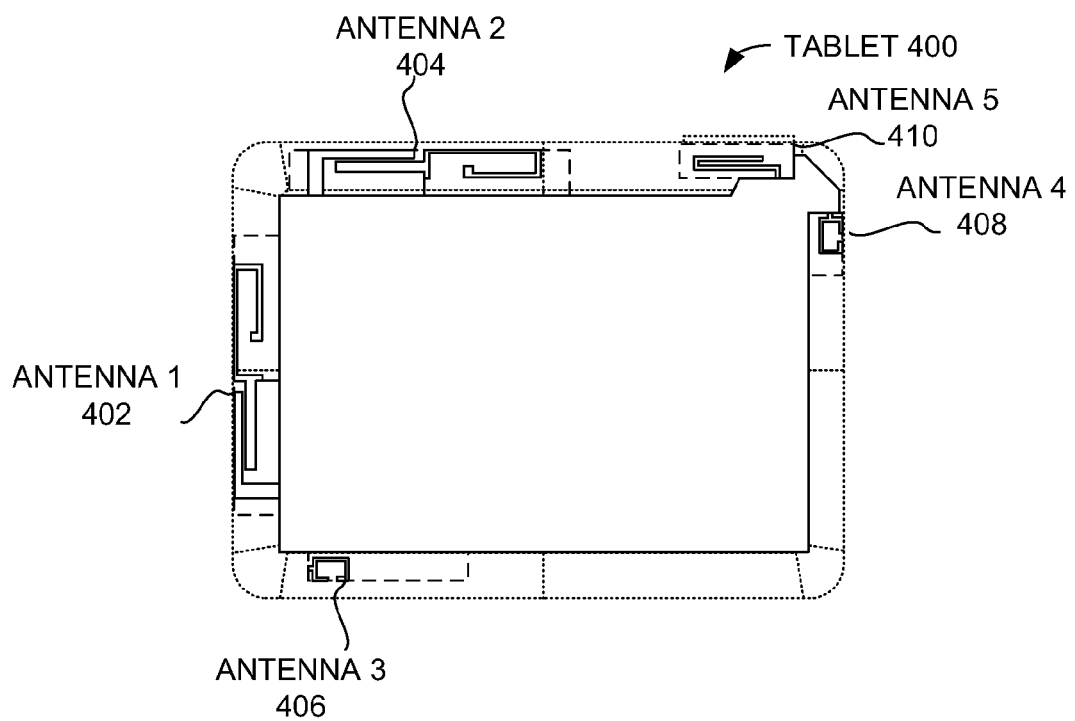
FIG. 4 illustrates one embodiment of a tablet computer having five antennas.
Figure 5:
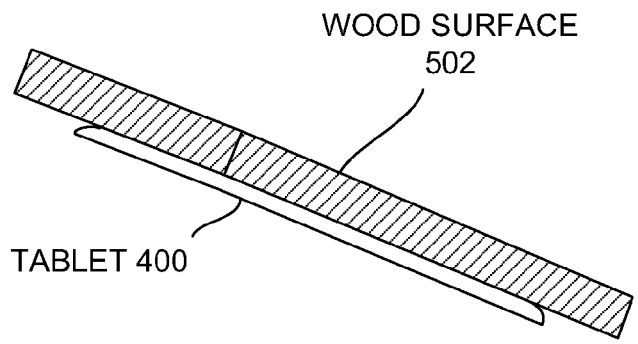
FIG. 5 illustrates one embodiment of a tablet computer in proximity to a wood surface.

FIG. 4 illustrates one embodiment of a tablet computer 400 having five antennas. The tablet computer 400 includes a first antenna 402, a second antenna 404, a third antenna 406, a fourth antenna 408 and a fifth antenna 410. In this embodiment, the first and second antennas 402 and 404 are multiband antennas configured to operate in multiple standard frequency bands, such as cellular bands, the third and fourth antennas 406 and 408 are WAN antennas (e.g., WiFi band(s)), and the fifth antenna 410 is a global positioning system (GPS) antenna. Although FIG. 5 illustrates specific types of antennas, in other embodiments, other types of antennas may be used. In this embodiment, any of the first, second, third, and fourth antennas 402-408 can be configured to transmit the transmit signal, and any one of the first, second, third, fourth, and fifth antennas 402-410 can be configured to receive the receive signal. Also, as described herein, multiple antennas can be configured to receive a receive signal, and the receive signals can be used to distinguish between the types of objects, as well as the position of the object. For example, if an object is near the second antenna 404, the processing component can transmit the transmit signal on one or more of the antennas, including the second antenna 404, and, using the receive signals measured on one or more of the antennas, can determine that the object is near the second antenna 404. When the processing component determines that the object is near the second antenna 404, the processing component can switch the primary transmit antenna to another antenna, such as to reduce the effects of SAR when the object is a human body part. Alternatively, the processing component can reduce the transmit power of the particular antenna when the object is near the second antenna 404, near the tablet computer 400, or under other specified conditions.

Figure 6:
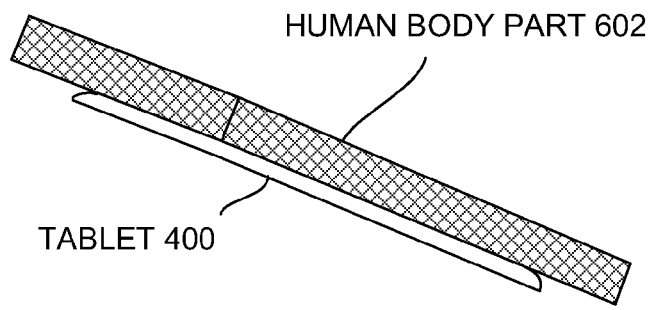
FIG. 6 illustrates one embodiment of a tablet computer in proximity to a human body part.
Figure 7:
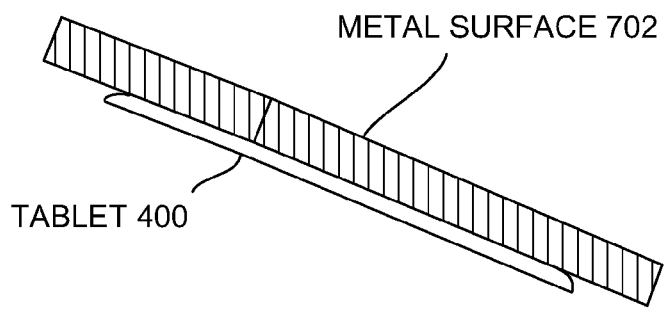
FIG. 7 illustrates one embodiment of a tablet computer in proximity to a metal surface.
Figure 8:
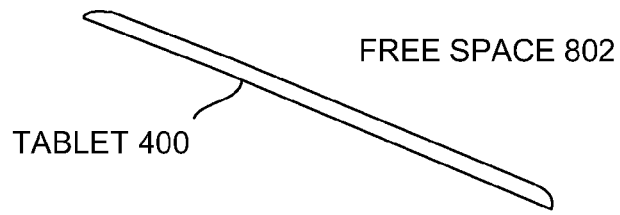
FIG. 8 illustrates one embodiment of a tablet computer in free space.

FIGS. 5-8 illustrate the table computer 400 of FIG. 4 in proximity to different types of objects and free space. In particular, FIG. 5 illustrates one embodiment of a tablet computer 400 in proximity to a wood surface 502. FIG. 6 illustrates one embodiment of the tablet computer 400 in proximity to a human body part 602. It should be noted that human body part 602 is represented as a rectangular box for ease of illustration. Further, the size of the human body part may vary in size that is in proximity to the user device, such as a hand holding the tablet computer 400 or the tablet computer 400 resting on a person's leg. FIG. 7 illustrates one embodiment of a tablet computer 400 in proximity to a metal surface 702. In each of these embodiments, the tablet computer 400 detects the presence of an object in proximity to the tablet computer 400 using the mutual coupling magnitude between at least two antennas of the tablet computer 400. The tablet computer 400 also distinguishes between the wood surface 502, human body part 602 and the metal surface 702 using the mutual coupling magnitude. Similarly, the tablet computer 400 can also distinguish between free space 802 and an object (e.g., wood surface 502, human body part 602, metal surface 702) using the mutual coupling magnitude as described herein.

Figure 9:
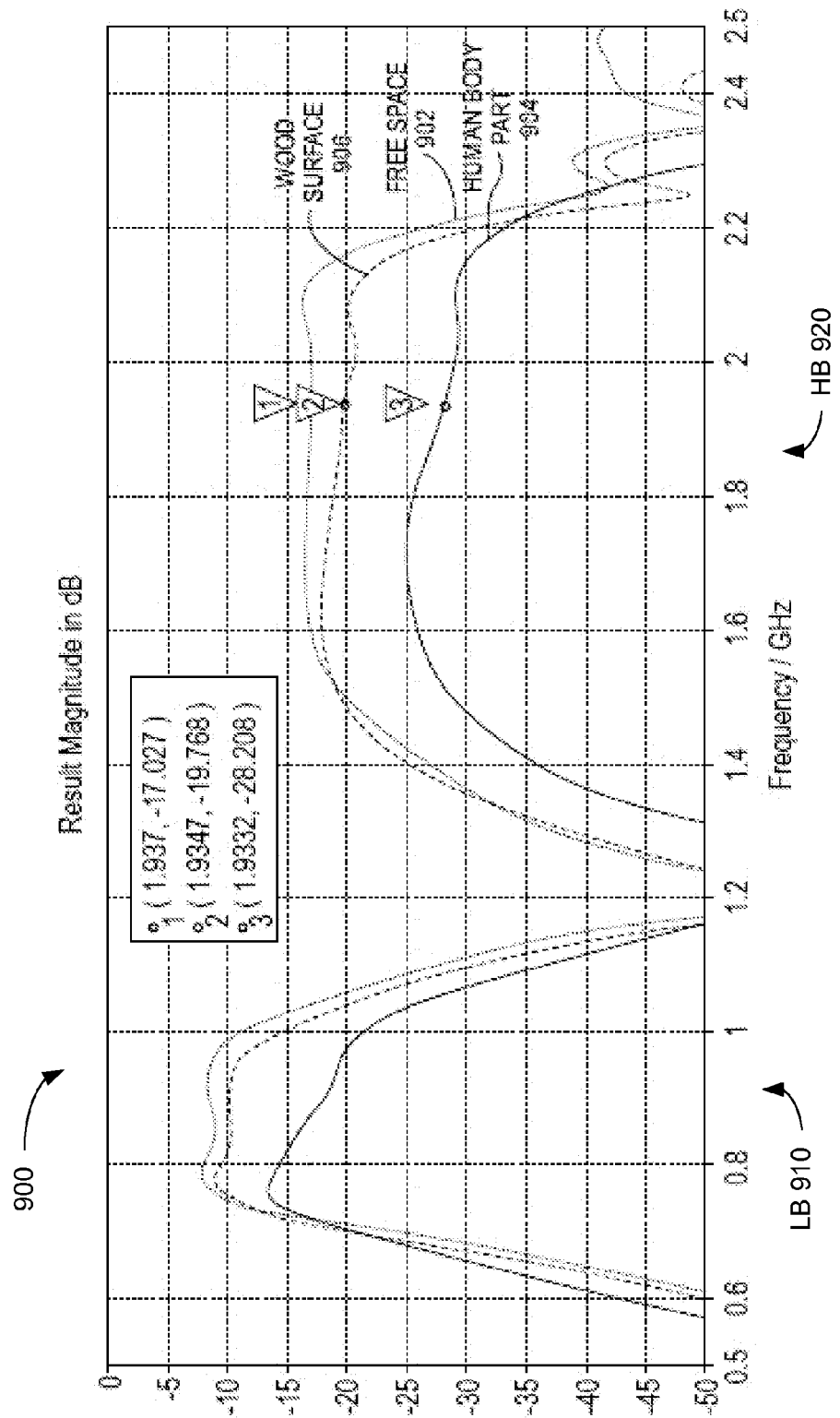
FIG. 9 is a graph of mutual coupling between two antennas of a user device in free space, in proximity to a human body part, and in proximity to a wood surface according to one embodiment.

FIG. 9 is a graph of mutual coupling between two antennas of a user device in free space 902, in proximity to a human body part 904, and in proximity to a wood surface 906 according to one embodiment. As illustrated in the graph, the mutual coupling for wood surface 906 and the human body part 904 are less than in free space 902 over a frequency range. In one embodiment, thresholds values can be set to distinguish between the object using the mutual coupling. For example, for 900 MHz, if the mutual coupling is below −10 dB, an object is detected. Furthermore, if for the same 900 MHz, if the mutual coupling is below −12 dB, the detected object is a human body part 904, instead of a wood surface 906. The wood surface 906 is one example of a non-water-based object that does not absorb electromagnetic radiation.

In the depicted embodiment, the first antenna is configured to operate in a low band 910 (e.g., approximately 700 MHz to 1.1 GHz) and a high band 920 (e.g., approximately 1.4 GHz to 2.2 GHz). In both the low band 910 and high band 920, the mutual coupling of the user device in free space 902 is greater than the mutual coupling of the user device when the object is in proximity to the user device, such as the mutual coupling when the wood surface 906 is present, and when the human body part 904 is present. As such, the mutual coupling can be measured and compared against one or more thresholds to determine whether the user device is in free space, or whether the user device is in proximity to the object, as well as determining the object type using the mutual coupling. In this embodiment, the second antenna is configured to operate in the same low band 910 and high band 920. For example, the first and second antennas are LTE antennas. However, in other embodiments, the second antenna may not be specifically configured to operate in the same low band 910 and high band 920, yet can be used to measure a receive signal in a subset or a superset of frequencies than capable by the first antenna. For example, the first antenna transmits a transmit signal at 2.4 GHz and the second antenna, a WAN antenna, measure a receive signal at 2.4 GHz to determine whether an object is present and to distinguish whether the object, if detected, is a human body part 904 or a wood surface 906. These distinctions between types of objects can be used in various types of applications. For example, if the object is the wood surface 906, the user device may not perform power throttling or antenna switching routines that might be performed when the object is the human body part 904.

In one embodiment, the threshold values can be set for a range of frequencies or for a specific frequency. For example, a range of values can be specified to indicate when the mutual coupling indicates that the object is a human body part 904. Similar ranges can be defined for the wood surface 906, the free space 902 or even for a metal surface. In another embodiment, the antennas can be tested to define a baseline value for the mutual coupling to set the threshold values for the different thresholds to distinguish between object types. In other embodiments, other techniques can be used to define the threshold values dynamically or statically as would be appreciated by one of ordinary skill in the art having the benefit of this disclosure. In one embodiment, the threshold values, or the ranges of values are stored in memory, such as non-volatile memory. In other embodiments, these values may be programmed or hardwired into the circuitry. Alternatively, the threshold values may be programmable and reprogrammable.

Figure 10:
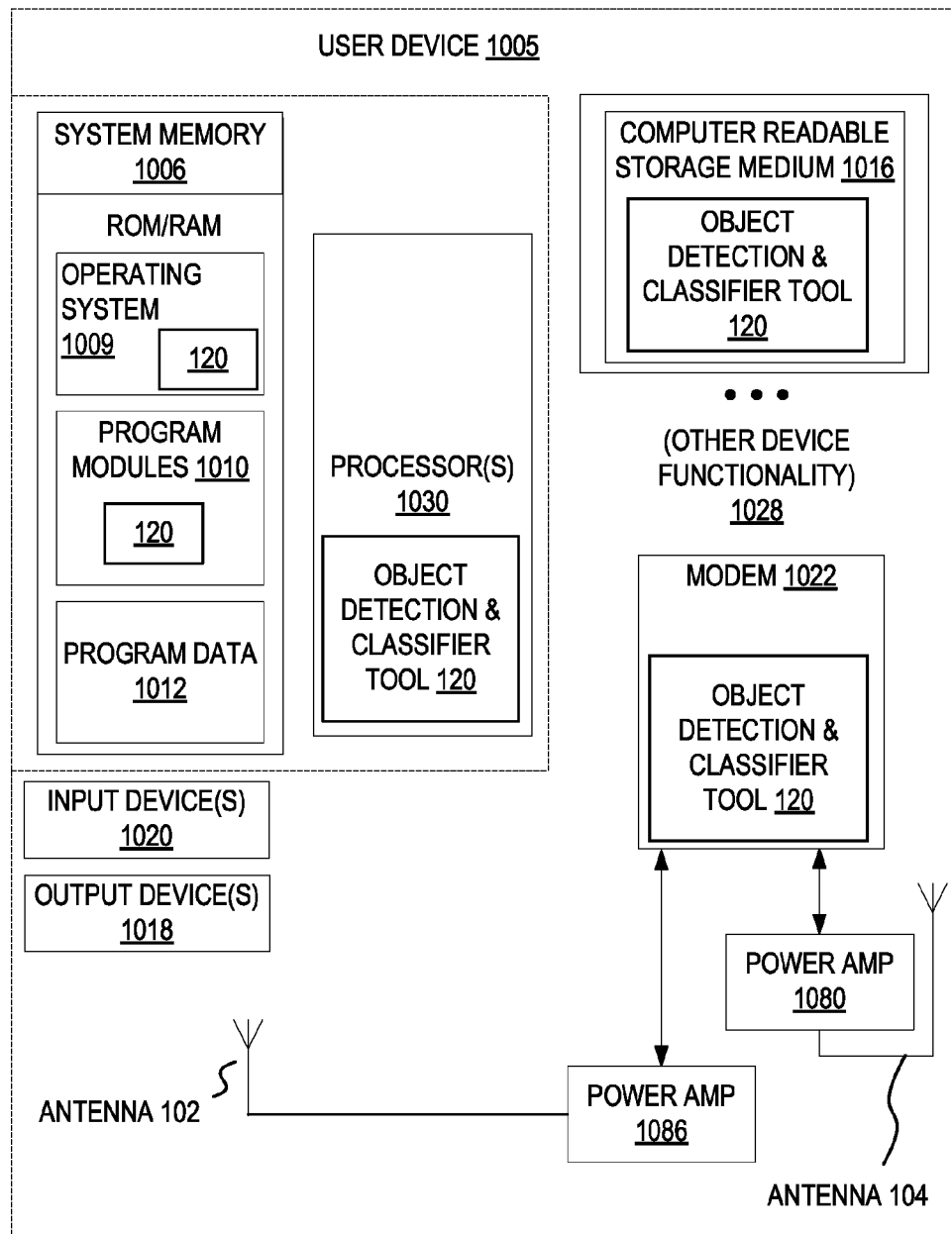
FIG. 10 is a block diagram of a user device for objection detection and object classification according to one embodiment.

FIG. 10 is a block diagram of a user device having for objection detection and object classification 120. The user device 1005 includes one or more processors 1030, such as one or more CPUs, microcontrollers, field programmable gate arrays, or other types of processing devices. The user device 1005 also includes system memory 1006, which may correspond to any combination of volatile and/or non-volatile storage mechanisms. The system memory 1006 stores information, which provides an operating system component 1008, various program modules 1010, program data 1012, and/or other components. The user device 1005 performs functions by using the processor(s) 1030 to execute instructions provided by the system memory 1006.

The user device 1005 also includes a data storage device 1014 that may be composed of one or more types of removable storage and/or one or more types of non-removable storage. The data storage device 1014 includes a computer-readable storage medium 1016 on which is stored one or more sets of instructions embodying any one or more of the functions of the user device 1005, as described herein. As shown, instructions may reside, completely or at least partially, within the computer readable storage medium 1016, system memory 1006 and/or within the processor(s) 1030 during execution thereof by the user device 1005, the system memory 1006 and the processor(s) 1030 constituting computer-readable media. The user device 1005 may also include one or more input devices 1020 (keyboard, mouse device, specialized selection keys, etc.) and one or more output devices 1018 (displays, printers, audio output mechanisms, etc.).

The user device 1005 further includes a wireless modem 1022 to allow the user device 1005 to communicate via a wireless network (e.g., such as provided by a wireless communication system) with other computing devices, such as remote computers, an item providing system, and so forth. The wireless modem 1022 allows the user device 1005 to handle both voice and non-voice communications (such as communications for text messages, multimedia messages, media downloads, web browsing, etc.) with a wireless communication system. The wireless modem 1022 may provide network connectivity using any type of digital mobile network technology including, for example, cellular digital packet data (CDPD), general packet radio service (GPRS), enhanced data rates for GSM evolution (EDGE), UMTS, 1 times radio transmission technology (1xRTT), evaluation data optimized (EVDO), high-speed downlink packet access (HSDPA), WiFi, etc. In other embodiments, the wireless modem 1022 may communicate according to different communication types (e.g., WCDMA, GSM, LTE, CDMA, WiMax, etc) in different cellular networks. The cellular network architecture may include multiple cells, where each cell includes a base station configured to communicate with user devices within the cell. These cells may communicate with the user devices 1005 using the same frequency, different frequencies, same communication type (e.g., WCDMA, GSM, LTE, CDMA, WiMax, etc), or different communication types. Each of the base stations may be connected to a private, a public network, or both, such as the Internet, a local area network (LAN), a public switched telephone network (PSTN), or the like, to allow the user devices 1005 to communicate with other devices, such as other user devices, server computing systems, telephone devices, or the like. In addition to wirelessly connecting to a wireless communication system, the user device 1005 may also wirelessly connect with other user devices. For example, user device 1005 may form a wireless ad hoc (peer-to-peer) network with another user device.

The wireless modem 1022 may generate signals and send these signals to power amplifier (amp) 1080 or power amp 1086 for amplification, after which they are wirelessly transmitted via the first antenna 102 or second antenna 104, respectively. Although FIG. 10 illustrates power amps 1080 and 1086, in other embodiments, a transceiver may be used for both antennas 102 and 104 to transmit and receive. The second antenna 104, which is an optional antenna that is separate from the first antenna 102, may be any directional, omnidirectional or non-directional antenna in a different frequency band than the frequency bands of the first antenna 102. The second antenna 104 may also transmit information using different wireless communication protocols than the first antenna 102. In addition to sending data, the first antenna 102 and the second antenna 104 also receive data, which is sent to wireless modem 1022 and transferred to processor(s) 1030. It should be noted that, in other embodiments, the user device 1005 may include more or less components as illustrated in the block diagram of FIG. 10.

In one embodiment, the user device 1005 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WiFi hotspot and a connection to a wireless carrier system. In one embodiment, the first wireless connection is associated with a first resonant mode of the first antenna 102 that operates at a first frequency band and the second wireless connection is associated with a second resonant mode of the first antenna 102 that operates at a second frequency band. In another embodiment, the first wireless connection is associated with the first antenna 102 and the second wireless connection is associated with the second antenna 104. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a single modem 1022 is shown to control transmission to both antennas 102 and 104, the user device 1005 may alternatively include multiple wireless modems, each of which is configured to transmit/receive data via a different antenna and/or wireless transmission protocol. In addition, the user device 1005, while illustrated with two antennas 102 and 104, may include more or fewer antennas in various embodiments.

The user device 1005 delivers and/or receives items, upgrades, and/or other information via the network. For example, the user device 1005 may download or receive items from an item providing system. The item providing system receives various requests, instructions and other data from the user device 1005 via the network. The item providing system may include one or more machines (e.g., one or more server computer systems, routers, gateways, etc.) that have processing and storage capabilities to provide the above functionality. Communication between the item providing system and the user device 1005 may be enabled via any communication infrastructure. One example of such an infrastructure includes a combination of a wide area network (WAN) and wireless infrastructure, which allows a user to use the user device 1005 to purchase items and consume items without being tethered to the item providing system via hardwired links. The wireless infrastructure may be provided by one or multiple wireless communications systems, such as one or more wireless communications systems. One of the wireless communication systems may be a wireless fidelity (WiFi) hotspot connected with the network. Another of the wireless communication systems may be a wireless carrier system that can be implemented using various data processing equipment, communication towers, etc. Alternatively, or in addition, the wireless carrier system may rely on satellite technology to exchange information with the user device 1005.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The user devices 1005 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 1005 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

Figure 11:
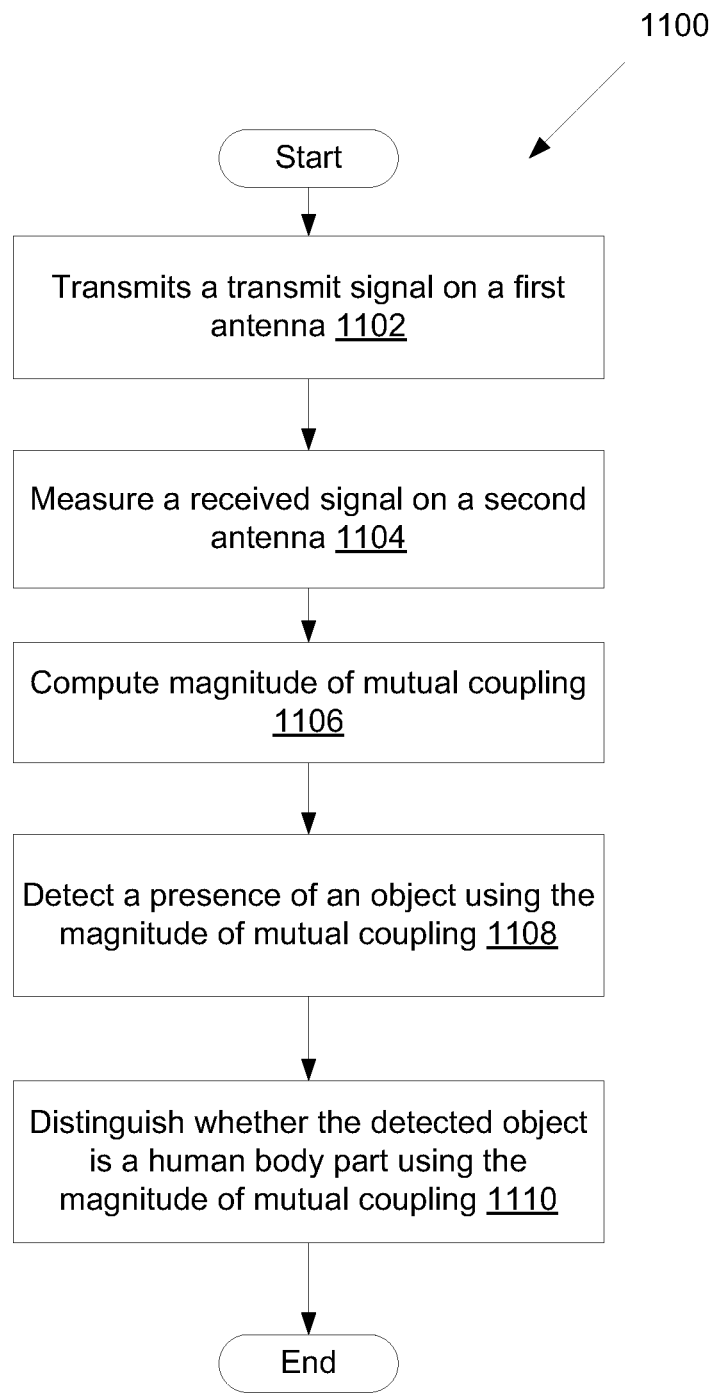
FIG. 11 is a flow diagram of an embodiment of a method of distinguishing between free space, a non-water-based object in proximity to a user device, or an object that absorbs electromagnetic radiation in proximity to the user device.

FIG. 11 is a flow diagram of an embodiment of a method 1100 of distinguishing between free space, a non-water-based object in proximity to a user device, or an object that absorbs electromagnetic radiation in proximity to the user device. The method 1100 may be performed by processing logic that may comprise hardware (circuitry, dedicated logic, etc.), software (such as is run on a general purpose computing system or a dedicated machine), firmware (embedded software), or any combination thereof. In one embodiment, the object detection and object classification tool 120 of FIGS. 1-2 is configured to perform the method 1100. Alternatively, the user device of FIGS. 1-8 is configured to perform the method 1100.

Referring to FIG. 11, the method 1100 begins by transmitting a transmit signal on a first antenna of a user device (block 1102). The processing logic measures a received signal on a second antenna of the user device, the received signal being based on the transmitted signal (block 1104). The processing logic computes a magnitude of mutual coupling between the first and second antennas using the transmitted signal and the received signal (block 1106). The processing logic detects a presence of an object in proximity to the user device using the magnitude of mutual coupling (block 1108). The processing logic distinguishes whether the detected object is a human body part that absorbs electromagnetic radiation or a second object type that does not absorb electromagnetic radiation using the magnitude of mutual coupling (1110).

In one embodiment, the processing logic distinguishes between object types by determining that the detected object is the human body part when the magnitude of mutual coupling exceeds a threshold value. In another embodiment, the processing logic determines whether the magnitude of mutual coupling exceeds a first threshold value that represents the detected presence of the object in proximity to the user device. In another embodiment, the processing logic distinguishes between object types by determining whether the magnitude of mutual coupling exceeds a second threshold value. When the magnitude of mutual coupling exceeds the second threshold value, the detected object is the human body part, and when the magnitude of mutual coupling exceeds the first threshold value and does not exceed the second threshold value, the detected object is of the second object type that does not absorb electromagnetic radiation.

Figure 12:
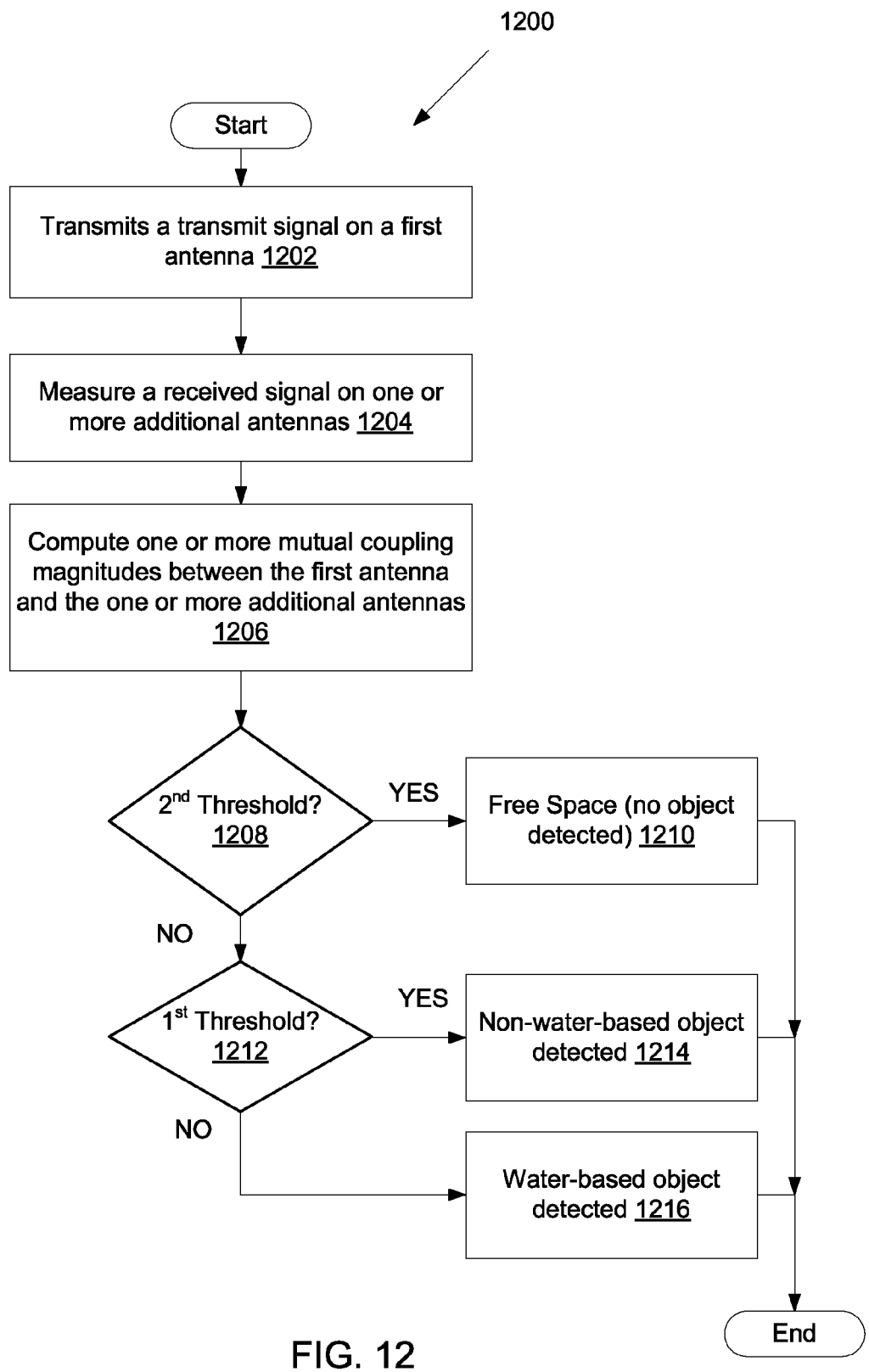
FIG. 12 is a flow diagram of another embodiment of a method of distinguishing between free space and different object types in proximity to a user device.

FIG. 12 is a flow diagram of another embodiment of a method 1200 of distinguishing between free space and different object types in proximity to a user device. The method 1200 may be performed by processing logic that may comprise hardware (circuitry, dedicated logic, etc.), software (such as is run on a general purpose computing system or a dedicated machine), firmware (embedded software), or any combination thereof. In one embodiment, the object detection and object classification tool 120 of FIGS. 1-2 is configured to perform the method 1200. Alternatively, the user device of FIGS. 1-8 is configured to perform the method 1200.

Referring to FIG. 12, the method 1200 begins by transmitting a transmit signal on a first antenna of the user device (block 1202). The processing logic measures a receive signal one or more additional antennas of the user device (block 1204). The processing logic computes one or more mutual coupling magnitudes between the first antenna and the one or more additional antennas (block 1206). The processing logic compares the mutual coupling magnitude(s) to a second threshold value (block 1208). When the mutual coupling magnitude(s) exceed the second threshold value, the processing logic determines that the user device is in free space (no object detected) (block 1210). However, if not, the processing logic determines if the mutual coupling magnitude(s) exceeds a first threshold value (block 1212). If so, the processing logic determines that an object is detected and that the object is a non-water-based object that does not absorb electromagnetic energy (block 1214). If the first threshold is not exceeded, the processing logic determines that an object is detected and that the object is a water-based object, such as a human body part, a SAR phantom, or the like (block 1216).

In another embodiment, the processing logic measures a magnitude of mutual coupling between two or more of antennas of the user device using a transmitted signal by one of the multiple antennas and a received signal by another one of the multiple antennas. The received signal corresponding to the transmitted signal. The processing logic distinguishes between the user device being proximate to free space, a first object type or a second object type. The first object type includes non-water-based objects that do not absorb electromagnetic radiation and the second object type includes objects that absorb electromagnetic radiation. In a further embodiment, the processing logic distinguishes between object types by detecting an object proximate to the user device using the magnitude of mutual coupling and then determines that the object is of the second object type when the magnitude of mutual coupling does not exceed a first threshold value. In a further embodiment, the processing logic determines that the object is of the first object type when the magnitude of mutual coupling exceeds the first threshold value and does not exceeds a second threshold value, the second threshold value being greater than the first threshold value. In a further embodiment, the processing logic detects the free space when the magnitude of mutual coupling exceeds the second threshold value.

In one embodiment, the processing logic reduces a transmit power used by one or more of the multiple antennas to transmit additional data to another device when the object is of the second object type (e.g., human body part). In another embodiment, the processing logic switches which antenna to be used as a primary transmit antenna in a multi-antenna configuration. In other embodiments, the processing logic can use the mutual coupling magnitudes to determine an approximate position of the object. For example, the processing logic can measure a mutual coupling between the first and second antenna, and the first antenna and a third antenna to determine a position of the object. In response, the processing logic can switch which to use a different antenna to transmit data, such as an antenna that is farther away from where the object is located.

In one embodiment, the processing logic transmits transmitting a first signal on a first antenna of the multiple antennas and measures a received signal on a second antenna of the plurality of antennas, the received signal corresponding to the transmitted first signal. The processing logic computes the magnitude of mutual coupling between the first antenna and the second antenna using the transmitted first signal and the received signal. The processing logic also measures a second received signal on a third antenna, the second received signal also corresponding to the transmitted first signal and computes a second magnitude of mutual coupling between the first antenna and the third antenna using the received signal and the second received signal. The processing logic may determine a position of the object using the magnitude of mutual coupling between the first antenna and the second antenna and the second magnitude of mutual coupling between the first antenna and the third antenna. For example, the processing logic can determine that the object is proximate to the first antenna. In response, the processing logic can switch transmission of information from the first antenna to another one of the antennas. Alternatively, the processing logic can reduce a transmit power of the first antenna in response to determining that the object is proximate to the first antenna.

In one embodiment, the processing logic resides in a processing component within a modem, and the processing logic transmits the first signal on the first antenna by driving the first signal using the modem. In another embodiment, the processing logic uses a signal generator coupled to a transmission line coupled to the first antenna via a first directional coupler, as described herein. In another embodiment, the processing component is in a processor that instructs the modem to transmit the first signal on the first antenna. In another embodiment, the processing logic measures the received signal using the modem. In another embodiment, the processing logic uses a receiver coupled to a receive line coupled to the second antenna via a second directional coupler as described herein.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present invention should, therefore, be determined with reference to the appended claims, along with the full scope of equivalents to which such claims are entitled.

What is claimed is:

1. A method comprising:
   transmitting a signal on a first antenna of a user device;
   measuring the transmitted signal on a second antenna of the user device;
   computing a magnitude of mutual coupling between the first antenna and the second antenna using the transmitted signal and the measured signal;
   detecting a presence of an object in proximity to the user device using the magnitude of mutual coupling; and
   distinguishing whether the detected object is likely to be a human body part that absorbs electromagnetic radiation or a second object type that does not absorb electromagnetic radiation using the magnitude of mutual coupling, wherein the distinguishing comprises:
      determining that the detected object is the human body part that absorbs electromagnetic radiation when the magnitude of mutual coupling between the first antenna and the second antenna does not exceed a first threshold value; and
      determining that the detected object is of the second object type that does not absorb electromagnetic radiation when the magnitude of mutual coupling between the first antenna and the second antenna exceeds the first threshold value and does not exceeds a second threshold value, the second threshold value being greater than the first threshold value.

2. The method of claim 1, wherein the second object type is at least one of wood, plastic, stone, or laminate.

3. The method of claim 1, wherein the detecting comprises determining whether the magnitude of mutual coupling exceeds the first threshold value that represents the detected presence of the object in proximity to the user device.

4. The method of claim 1, further comprising detecting the user device being proximate to free space when the magnitude of mutual coupling between the first antenna and the second antenna exceeds the second threshold value.

5. A non-transitory computer-readable storage medium storing instructions that when executed by a computing system of a user device cause the computing system to perform operations, comprising:

receiving a measurement of a first magnitude of mutual coupling between a plurality of antennas of the user device, wherein the first magnitude of mutual coupling is based on a transmitted signal by one of the plurality of antennas and a received signal received by another one of the plurality of antennas, the received signal representing the transmitted signal measured by the other one of the plurality of antennas;

using the first magnitude of mutual coupling, distinguishing between the user device being proximate to free space, proximate to a first object type or proximate to a second object type, wherein the first object type comprises non-water-based objects that do not absorb electromagnetic radiation and the second object type comprises objects that absorb electromagnetic radiation, wherein the distinguishing comprises:
  detecting an object proximate to the user device using the first magnitude of mutual coupling;
  determining that the object is of the second object type when the first magnitude of mutual coupling does not exceed a first threshold value; and
  determining that the object is of the first object type when the first magnitude of mutual coupling exceeds the first threshold value and does not exceeds a second threshold value, the second threshold value being greater than the first threshold value.

6. The non-transitory computer-readable storage medium of claim 5, wherein the distinguishing comprises detecting the free space when the first magnitude of mutual coupling exceeds the second threshold value.

7. The non-transitory computer-readable storage medium of claim 5, wherein the instructions are configured to perform further operations comprising instruct the computing system to reduce a transmit power used by one or more of the plurality of antennas to transmit additional data to another device when the object is of the second object type.

8. The non-transitory computer-readable storage medium of claim 5, wherein the instructions are configured to perform further operations comprising:
  instructing a first antenna of the plurality of antennas to transmit a first signal;
  receiving another indication of a first received signal on a second antenna of the plurality of antennas, the first received signal representing the transmitted first signal measured by the second antenna; and
  computing the first magnitude of mutual coupling between the first antenna and the second antenna using the transmitted first signal and the first received signal.

9. The non-transitory computer-readable storage medium of claim 8, wherein the transmitting the first signal on the first antenna comprises instructing a modem of the user device to drive the first signal.

10. The non-transitory computer-readable storage medium of claim 8, wherein the transmitting the first signal on the first antenna comprises instructing a signal generator to drive the first signal, the signal generator coupled to a transmission line coupled to the first antenna via a directional coupler.

11. The non-transitory computer-readable storage medium of claim 8, wherein the receiving the other indication of the first received signal on the second antenna comprises measuring the first received signal using a modem of the user device.

12. The non-transitory computer-readable storage medium of claim 8, wherein the receiving the other indication of the first received signal on the second antenna comprises measuring the first received signal using a receiver coupled to a receive line coupled to the second antenna via a directional coupler.

13. A non-transitory computer-readable storage medium storing instructions that when executed by a computing system of a user device cause the computing system to perform operations, comprising:
  receiving a measurement of a first magnitude of mutual coupling between a plurality of antennas of the user device, wherein the first magnitude of mutual coupling is based on a transmitted signal by one of the plurality of antennas and a received signal received by another one of the plurality of antennas, the received signal representing the transmitted signal measured by the other one of the plurality of antennas;
  using the first magnitude of mutual coupling, distinguishing between the user device being proximate to free space, proximate to a first object type or proximate to a second object type, wherein the first object type comprises non-water-based objects that do not absorb electromagnetic radiation and the second object type comprises objects that absorb electromagnetic radiation;
  instructing a first antenna of the plurality of antennas to transmit a first signal;
  receiving another indication of a first received signal on a second antenna of the plurality of antennas, the first received signal representing the transmitted first signal measured by the second antenna;
  computing the first magnitude of mutual coupling between the first antenna and the second antenna using the transmitted first signal and the first received signal;
  receiving a second indication of a second received signal measured on a third antenna of the plurality of antennas, the second received signal representing the transmitted first signal measured on the third antenna; and
  computing a second magnitude of mutual coupling between the first antenna and the third antenna using the first received signal and the second received signal.

14. The non-transitory computer-readable storage medium of claim 13, wherein the instructions are configured to perform further operations comprising:
  determining that the object is proximate to the first antenna using the first magnitude and the second magnitude; and
  in response to the determining that the object is proximate to the first antenna, switching transmission of information from the first antenna to another one of the plurality of antennas.

15. A user device, comprising:
  a first antenna configured to communicate first data in a transmitting mode of the user device and to transmit second data in a sensing mode of the user device;
  a second antenna configured to communicate third data in the transmitting mode and to receive the second data in the sensing mode; and
  a processing device coupled to the first antenna and the second antenna, wherein the processing device is configured to measure a mutual coupling magnitude between the first antenna and the second antenna and to detect a presence of an object in proximity to one or both of the first antenna and the second antenna using the mutual coupling magnitude, wherein the processing device is configured to distinguish whether the object is of a first object type that absorbs electromagnetic radiation or of a second object type that does not absorb electromagnetic radiation using the mutual coupling magnitude.

16. The user device of claim 15, wherein the processing device is configured to compare the mutual coupling magnitude against a threshold value to distinguish whether the object is of the first object type or of the second object type.

17. The user device of claim 15, wherein the first object type comprises a human body part, and wherein the second object type comprises at least one of a non-conductive object or a non-water-based object.

18. The user device of claim 15, wherein the second object type comprises at least one of wood objects, plastic objects, stone objects, or laminates.

19. The user device of claim 15, wherein the processing device is configured to distinguish whether the object is of the first object type, the second object type or a third object type, wherein the third object type comprises metal.

20. The user device of claim 15, further comprising:
a transmit signal generator; and
a first directional coupler configured to couple the transmit signal generator to a transmission line coupled to the first antenna.

21. The user device of claim 15, further comprising:
a receiver; and
a second directional coupler configured to couple the receiver to a receive line coupled to the second antenna.

22. An apparatus comprising
a processing component coupled to a plurality of antennas each configured to configured to transmit, receive, or both transmit and receive information to or from another device, wherein the processing component is configured to determine a mutual coupling magnitude between two or more of the plurality of antennas, to determine a presence of an object in proximity to one or more of the plurality of antennas using the mutual coupling magnitude, and to determine when the object is one that absorbs electromagnetic radiation using the mutual coupling magnitude, wherein the processing component is further to:
determine that the object is one that absorbs electromagnetic radiation when the mutual coupling magnitude between the two or more of the plurality of antennas does not exceed a first threshold value; and
determine that the detected object is of a second object type that does not absorb electromagnetic radiation when the mutual coupling magnitude between the two or more of the plurality of antennas exceeds the first threshold value and does not exceeds a second threshold value, the second threshold value being greater than the first threshold value.

23. The apparatus of claim 22, wherein the processing component is configured to transmit first data using a first antenna of the plurality of antennas at a first transmit power level, and wherein the processing component is configured to transmit second data using the first antenna at a second transmit power level when the object is one that absorbs electromagnetic radiation.

24. The apparatus of claim 22, wherein the processing component is configured to transmit first data using a first antenna of the plurality of antennas, and wherein the processing component is configured to switch to transmit second data using a second antenna of the plurality of antennas when the object is one that absorbs electromagnetic radiation.

25. The apparatus of claim 22, further comprising a modem, coupled to the plurality of antennas, wherein the processing component is a processor coupled to the modem.

26. The apparatus of claim 22, further comprising a modem in which the processing component resides, wherein the modem is coupled to the plurality of antennas.

27. The apparatus of claim 22, further comprising a transmit signal generator to generate a first signal to be transmitted by one of the plurality of antennas.

28. The apparatus of claim 27, wherein the transmit signal generator resides in the processing component.

29. An apparatus comprising
a processing component coupled to a plurality of antennas each configured to configured to transmit, receive, or both transmit and receive information to or from another device, wherein the processing component is configured to determine a mutual coupling magnitude between two or more of the plurality of antennas, to determine a presence of an object in proximity to one or more of the plurality of antennas using the mutual coupling magnitude, and to determine when the object is one that absorbs electromagnetic radiation using the mutual coupling magnitude, wherein the processing component is configured to determine a first coupling magnitude between a first antenna and a second antenna of the plurality of antennas and a second coupling magnitude between the first antenna and a third antenna of the plurality of antennas, and wherein the processing component is configured to determine a position of the object in relation to the first, second and third antennas using the first coupling magnitude and the second coupling magnitude.

30. The apparatus of claim 29, wherein the processing component is configured to transmit first data using the first antenna of the plurality of antennas at a first transmit power level, and wherein the processing component is configured to transmit second data using the first antenna at a second transmit power level when the object is one that absorbs electromagnetic radiation.

31. The apparatus of claim 29, wherein the processing component is configured to transmit first data using the first antenna of the plurality of antennas, and wherein the processing component is configured to switch to transmit second data using the second antenna of the plurality of antennas when the object is one that absorbs electromagnetic radiation.

* * * * *

UNITED STATES PATENT AND TRADEMARK OFFICE
CERTIFICATE OF CORRECTION

PATENT NO.       : 8,798,695 B1
APPLICATION NO.  : 13/621646
DATED            : August 5, 2014
INVENTOR(S)      : Zheng et al.

It is certified that error appears in the above-identified patent and that said Letters Patent is hereby corrected as shown below:

In the Claims

In claim 22, column 17 line 27, should be "configured to";

In claim 29, column 18 line 22, should be "configured to".

Signed and Sealed this
Sixth Day of January, 2015

Michelle K. Lee
*Deputy Director of the United States Patent and Trademark Office*